May 14, 1968 R. S. ENGELBRECHT 3,383,618
SUPPRESSION OF INTERMODULATION DISTORTION
Filed March 10, 1966
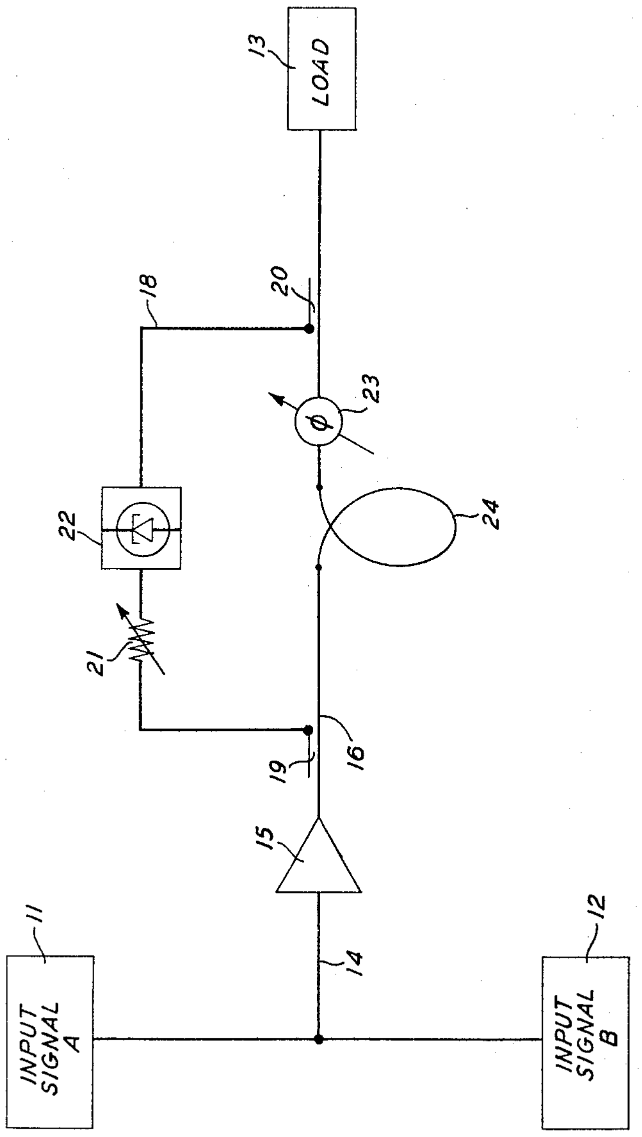
INVENTOR
R. S. ENGELBRECHT
BY
ATTORNEY United States Patent Office 3,383,618 Patented May 14, 1968

3,383,618
SUPPRESSION OF INTERMODULATION DISTORTION

Rudolf S. Engelbrecht, Bernardsville, N.J., assignor to Bell Telephone Laboratories, Incorporated, New York, N.Y., a corporation of New York Filed Mar. 10, 1966, Ser. No. 533,150
7 Claims. (Cl. 330—149)

This invention relates to transmission circuits, and more particularly to circuits that simultaneously transmit energy at a plurality of frequencies.

Wideband transmission circuits are frequently used for simultaneously transmitting information in a number of different frequency channels. The upper limit of signal power that can be transmitted in such circuits is usually determined by the intermodulation distortion or "cross-talk" that can be tolerated. This is because amplifiers in the transmission circuit will simultaneously amplify the different frequencies without mixing only if they are operated in their "linear" region, i.e., at signal power levels much below the saturation power level of the amplifier. As the signal power level increases, the output of the amplifier progressively becomes a nonlinear function of the input; as a result, the amplifier mixes the signal frequencies to generate intermodulation distortion components.

Of course, the maintenance of the signal powers at levels well within the region of linear response of the amplifier severely limits the power capacity of many transmission circuits. Intermodulation distortion may also occur in other wideband amplifiers, such as audio amplifiers, which operate on a single signal. To some extent, the use of "push-pull" output stages in audio amplifiers decreases the effect of sprious harmonic frequency generation, but is generally ineffective in reducing spurious sideband frequencies primarily responsible for intermodulation distortion.

Accordingly, it is an object of this invention to increase the power capacity of transmission circuits.

More specifically, it is an object of this invention to reduce the effects of intermodulation distortion in transmission circuits.

These and other objects of the invention are attained in an illustrative embodiment thereof comprising a transmission circuit for simultaneously transmitting energy at discrete signal frequency bands or channels A and B. Included in the transmission circuit is a conventional amplifier which will amplify frequencies A and B independently of each other only so long as the signal power level does not drive the amplifier beyond its region of linear operation. In accordance with my invention, it is assumed that the signal levels are high enough, at least at times, to drive the amplifier into its non-linear operating region. Hence, a certain amount of "cross-talk" occurs with resulting intermodulation distortion caused by the generation of spurious frequencies such as 2A–B and 2B–A. Although these components are small by comparison to the amplified frequencies A and B, they are transmitted to the output line of the amplifier and may constitute troublesome interference with some weak wanted signals at or near frequencies 2A–B and 2B–A.

In accordance with the invention, a compensation circuit is coupled to the output line of the amplifier for reducing or eliminating the effects of intermodulation distortion. An input coupler to the compensation circuit derives a small quantity of the energy on the output line. The derived energy is transmitted through a sensitive non-linear device, such as a tunnel diode, which then generates intermodulation distortion components such as 2A–B. These generated distortion components are coupled back onto the output line 180 degrees out of phase with the energy on the output line. The 180 degree phase difference causes destructive interference between the distortion components on the output line and those coupled from th compensation circuit, thereby effectively canceling out the distortion components on the output line. The canceled components include the various spurious harmonic frequencies in addition to the difference frequencies specifically mentioned.

As will be explained more fully later, the non-linear device in the compensation circuit should generate distortion components much more efficiently than the amplifier. Hence, a relatively low power input of frequencies A and B to the compensation circuit will produce output distortion components such as 2A–B of approximately the same magnitude as the distortion components in the output line. At microwave frequencies a backward diode or a tunnel diode works particularly well as the non-linear device because it is effectively an efficient low level mixer. The input power to the non-linear device is controlled by the input coupler and by an adjustable attenuator in the compensation circuit. In order that the magnitude of the distortion components of the compensation circuit approximately match a varying magnitude of the distortion components in the output line, the electrical length of the compensation circuit and the output line between the input and output coupler should be substantially equal. A 180 degree phase difference between the compensation circuit and the output line can be maintained by an adjustable phase shifter in either the output line or the compensation circuit.

These and other objects and features of my invention will be better understood from a consideration of the following detailed description, taken in conjunction with the accompanying drawing, which is a schematic diagram of a transmission circuit in accordance with an illustrative embodiment of the invention.

Referring now to the drawing, there is shown a transmission circuit for transmitting separate signal frequencies A and B from sources 11 and 12 to a load 13. The two frequencies A and B are transmitted by an input line 14 to an amplifier 15 which amplifies the two frequencies simultaneously and transmits them to an output line 16. When the signal power input is sufficiently high, the amplifier operates in its non-linear region to generate spurious sideband and harmonic distortion components. Of particular interest are the intermodulation distortion components at freqeicies 2A–B and 2B–A, also within the desired operating range of amplifier 15. Components 2A–B and 2B–A therefore cannot be suppressed by conventional techniques such as filtering.

In accordance with the invention, a compensation circuit 18 is coupled to the output line 16 by an input directional coupler 19 and an output directional coupler 20. The purpose of the compensation circuit 18 is to generate distortion components which will compensate for and cancel out the intermodulation distortion components generated by the amplifier 15. Included in the compensation circuit are an adjustable attenuator 21 and a nonlinear device 22, preferably a tunnel diode. Included in the output lines between directional couplers 19 and 20 is an adjustable phase rontrol device 23.

The input coupler 19 derives a controlled quantity of the amplified signal power from the output line 16 and delivers it to the non-linear device 22 by way of the variable attenuator 21. The non-linear device 22 is in effect a low level efficient modulator which mixes the signal components A and B to produce a high proportion of distortion components 2A–B and 2B–A. These distortion components are coupled back onto the output line by the output coupler 20. An extension 24 is shown included in the output line 16 for making the electrical length of the output line between couples 19 and 20 equal to the electrical length of the compensation circuit 18. The phase control 23 is adjusted so that at output coupler 20 the phase of the distortion components on the output line 16 is at 180 degrees with respect to the distortion components coupled onto the output line from circuit 18. The attenuator 21 is adjusted for equal magnitudes of direct and coupled components. Hence, the distortion components from the non-linear device 22 destructively interfere with the distortion components from the output line and cancel them out. Because the electrical lengths of the two paths are equal, this destructive interference is obtained over a wide frequency range. The spurious intermodulation components on the output line are therefore reduced or eliminated with negligible effects on the desired signal frequencies A and B.

In addition to the difference frequencies mentioned, the intermodulation distortion components include various combinations of other difference frequencies, sum frequencies and harmonic frequencies. As long as neither the amplifier nor the non-linear device are operated at or near saturation, they both will generate the same relative proportions of these various frequencies. All of the various distortion components, will, therefore be equally suppressed. Generally speaking, the amplifier is not operating in a saturation region when the total intermodulation distortion components are at 30 to 40 decibels below the signal level.

For preferred optimum operation, the non-linear device 22 should mix the signal frequencies as efficiently as possible so that the signal power derived by input coupler 19 can be kept at a minimum. A wideband transmission circuit of the type shown in FIG. 1 has been built which operates at a signal frequency centered at 1300 megacycles. It was found that when the coupling loss of the input coupler 19 is such as to give a signal power in the compensation circuit 18 that is at least 20 decibels lower than the signal power on the output line 16, the loss of signal power and the transmission distortion resulting from signal wave coupling are negligible. Since the tunnel diode is an efficient mixer, the signal power in the compensation circuits was typically about 26 decibels less than that in the output line 16 for generating sufficient distortion component power to cancel the distortion components on the output line. Precise matching of the magnitude of the compensating distortion components to those on the output line were made by adjustment of the variable attenuator 21.

In the constructed circuit, amplifier 15 was an L-band microwave amplifier using GF–40037 transistors. The non-linear device 22 was a gallium antimonide *Sb*–5 tunnel diode biased at 82 millivolts. The transmission extension 24 was 5 wavelengths long at the operating frequency of 1300 megacycles. The circuits constructed with these components were found to reduce substantially the intermodulation distortion resulting from high signal power amplification.

From the foregoing it is clear that many modifications of the circuit of FIG. 1 could be made if so desired. For example, the phase control device 23 could be incorporated in the compensation circuit 18 rather than in the output line for obtaining the required 180 degree phase shift for distortion cancellation. The bias voltage of the tunnel diode could be controlled for matching diode output with the magnitude of the distortion components on line 16. Either the diode bias or the variable attenuator 21 may be automatically controlled as a function of the signal power so as to obtain consistent optimum matching. Of course, as mentioned before, non-linear devices other than tunnel diodes, such as backward diodes, varactor diodes, or low-level transistors, can be used for generating the compensatory distortion components if so desired. Further, the invention can be used for canceling distortion components generated by devices other than amplifiers and even in circuits that transmit only a single wideband signal frequency channel.

Various other modifications and embodiments may be made by those skilled in the art without departing from the spirit and scope of the invention.

What is claimed is:

1. In combination:

an input line for transmitting energy at two or more discrete signal frequencies;

an amplifier connected to the input line for simultaneously amplifying energy at both frequencies and for transmitting it to an output line;

means for deriving a predetermined quantity of the signal energy from the output line;

means comprising a tunnel diode for generating distortion components in response to the derived signal energy;

means for adjusting the phase of the distortion components and of the energy on the output line to be at substantially 180 degrees with respect to each other;

and means for coupling the distortion components onto the output line, thereby to reduce the effects of intermodulation distortion of the amplifier.

2. The combination of claim 1 wherein:

the tunnel diode is located in a compensation circuit;

the electrical length of the compensation circuit is substantially equal to the electrical length of the output line between the deriving means and the coupling means.

3. In combination:

an input line for transmitting energy at two discrete signal frequencies;

an electronic device connected to the input line for simultaneously operating on energy at both frequencies and for transmitting it to an output line, said operation resulting in the generation of spurious first distortion components which are also transmitted to the output line;

means comprising a compensation circuit for deriving a predetermined quantity of the energy at the two signal frequencies from the output line;

means comprising a non-linear element in the compensation circuit for generating second distortion components in response to the derived energy;

output coupler means for coupling the second distortion components onto the output line;

and means for adjusting the relative phase of the first and second distortion components to be at substantially 180 degrees, whereby at least part of the first distortion components are cancelled at the output coupler.

4. The combination of claim 3 wherein:

the electrical length of the compensation circuit is substantially equal to the electrical length of the output line between the deriving means and the output coupler.

5. The combination of claim 4 wherein:

the phase shifting means includes an adjustable phase control device;

and further comprising an adjustable amplitude control device in the compensating circuit for approximately matching the amplitude of the second distortion components to that of the first distortion components.

6. The combination of claim 5 wherein:
the electronic device is an amplifier which, under conditions of high gain, generates spurious distortion components at 2A–B where A and B are the two distinct frequencies;
and the non-linear device is a varactor diode which, in response to A and B, also generates distortion components at 2A–B, the ratio of generated distortion components to input energy of the varactor diode being much higher than that of the amplifier.
7. The combination of claim 6 wherein:
the power of the derived energy in the compensation circuit is approximately 20 decibels less than the power of the signal energy in the output line.

References Cited

UNITED STATES PATENTS 2,968,716 1/1961 Bearer et al. ------ 330—149 X

JOHN KOMINSKI, *Acting Primary Examiner.*

J. B. MULLINS, *Assistant Examiner.*